United States Patent [19]

Lankston

[11] 4,444,331

[45] Apr. 24, 1984

[54] CLOSURE ASSEMBLY

[75] Inventor: Robert J. Lankston, Shawnee, Kans.

[73] Assignee: Gulf & Western Manufacturing Co., Southfield, Mich.

[21] Appl. No.: 439,692

[22] Filed: Nov. 8, 1982

[51] Int. Cl.³ .................... B65D 41/04; B65D 53/02
[52] U.S. Cl. ................................. 220/304; 220/316; 220/378; 285/355
[58] Field of Search ............. 220/304, 316, 240, 378, 220/288, 3; 215/270; 285/347, 355

[56] References Cited

U.S. PATENT DOCUMENTS

| | | | |
|---|---|---|---|
| 2,079,769 | 5/1937 | McAbee | 220/3 |
| 2,684,779 | 7/1954 | Rafferty | 220/304 X |
| 2,839,218 | 6/1958 | Zerbe | 220/240 |
| 2,967,744 | 1/1961 | Davies | 220/240 |
| 3,092,962 | 6/1963 | Wood | 220/3 X |
| 3,203,576 | 8/1965 | Wout et al. | 220/304 |
| 3,225,929 | 12/1965 | Sicard . | |
| 3,339,787 | 9/1967 | Pechacek | 220/378 |
| 3,462,041 | 8/1969 | Wilson . | |
| 3,578,202 | 5/1971 | Mainet | 220/240 |
| 3,605,337 | 9/1971 | Rodgers | 220/316 X |
| 3,721,363 | 3/1973 | Bressler et al. . | |
| 3,780,901 | 12/1973 | Pechacek . | |
| 3,990,605 | 11/1976 | Hanke et al. . | |
| 4,055,359 | 10/1977 | McWethy | 285/347 X |
| 4,067,534 | 1/1978 | Frey | 285/369 X |
| 4,139,118 | 2/1979 | Parker | 220/316 |
| 4,150,847 | 4/1979 | De Cenzo | 285/369 X |

Primary Examiner—Allan N. Shoap
Attorney, Agent, or Firm—A. Thomas Kammer

[57] ABSTRACT

A closure assembly is provided for high pressure applications. It includes a hollow cylindrical member having a beveled end for welding to a pressure vehicle and a threaded end for receiving a cap. An annular projection extends from the threaded end and includes a O-ring for sealing purposes. The projection has relatively thin walls which allow it to dilate under pressure and provide an excellent seal.

1 Claim, 3 Drawing Figures

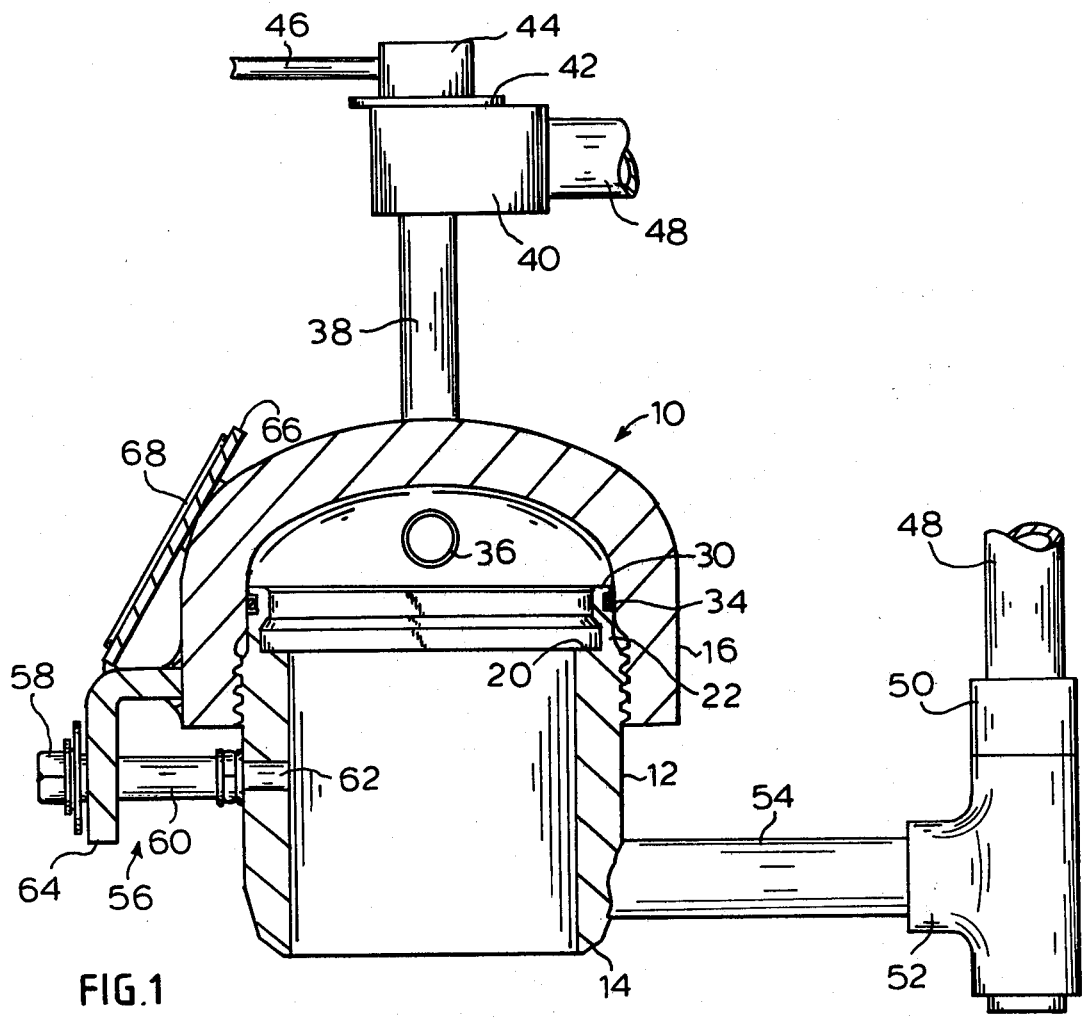
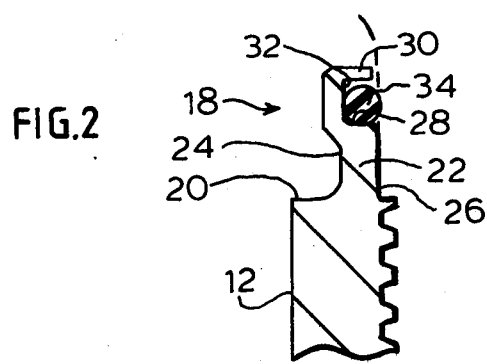

CLOSURE ASSEMBLY

BACKGROUND OF THE INVENTION

1. Field of the Invention

The invention relates to a closure assembly for high pressure applications.

2. Brief Description of the Prior Art

There are a number of available devices for providing quick access to a pipe or other pressure containing vehicle. U.S. Pat. Nos. 3,721,363 and 4,288,001 are representative of such devices.

Threaded closures have been employed for application to smaller pipes and the like. Those currently on the market typically employ a gasket in the end of the flange or cover for sealing purposes. Unfortunately, the gaskets tend to fall out and become damaged during installation. Preloading is also required to prevent the gaskets from blowing out under pressure.

SUMMARY OF THE INVENTION

A closure arrangement is provided for high pressure applications. It includes a hollow cylindrical member having exterior threads and a thin wall portion extending from the end thereof. Sealing means are provided about the thin wall portion. After a cover is applied to the cylindrical member and the pressure increases, the thin wall portion expands outwardly causing the sealing means to provide a seal between it and the cover. The sealing means is preferably an O-ring fitted within a circumferential groove.

BRIEF DESCRIPTION OF THE DRAWINGS

FIG. 1 is a partially sectional view illustrating a closure arrangement according to the invention;

FIG. 2 is an enlarged sectional view illustrating sealing means thereof; and

DETAILED DESCRIPTION OF THE INVENTION

Figure 3:
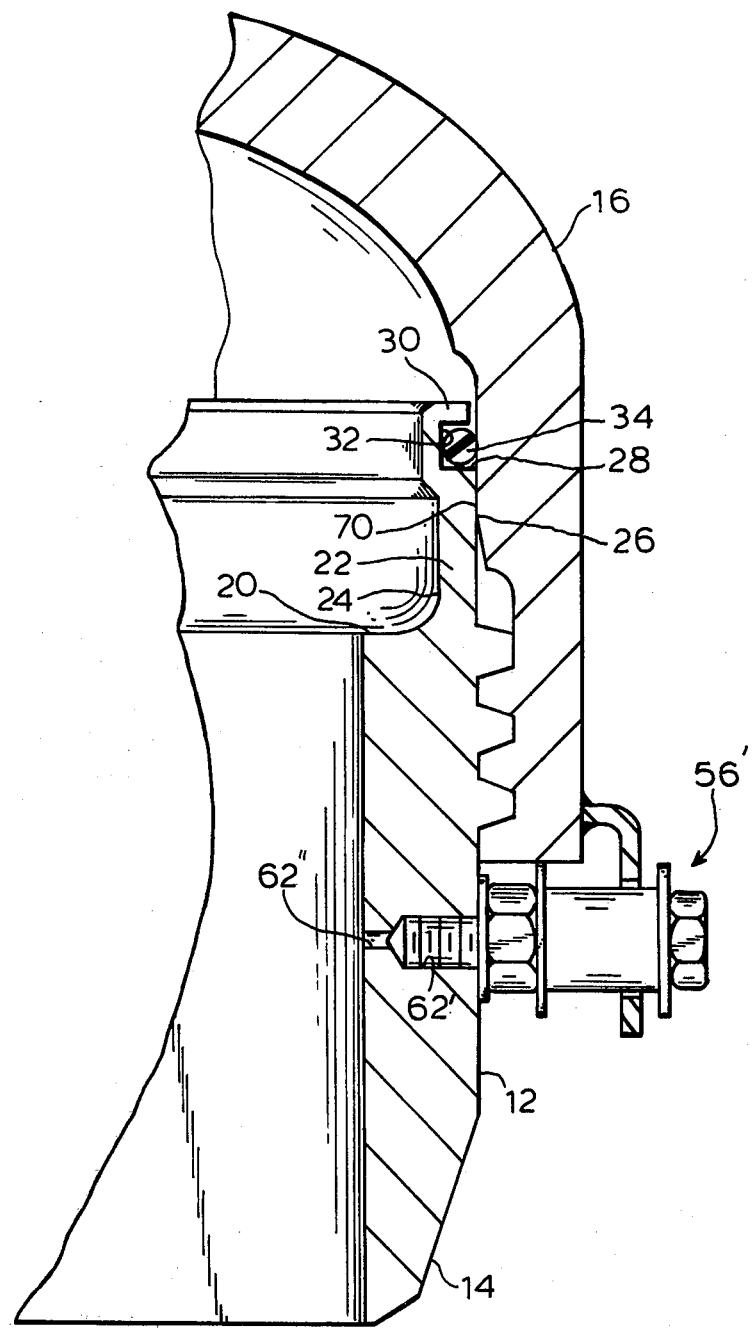
FIG. 3 is an enlarged sectional view of an alternative embodiment of the invention.

A closure assembly 10 is provided for high pressure applications. It includes a hollow cylindrical member 12 having a beveled end 14 which is welded to a pipeline or the like and an end for receiving an internally threaded cap 16. An annular projection 18 extends from the latter end 20 of the flange member 12 and includes a thin wall portion 22 having an internal surface 24 and and external surface 26, an annular groove defined by a shoulder 28, flange 30, and annular surface 32, and an O-ring 34 positioned within the groove. The projection 18 is carved out radially at the portion 22 with respect to the groove portion to facilitate its deflection under pressure.

The external surface 26 is positioned so that it will contact the interior surface of the threaded cap 16. The flange 30 does not extend radially outwardly as far as this surface 26 to provide sufficient clearance and to insure that it will not contact the interior cap surface before surface 26 does. Under pressurized conditions, the O-ring 34 is urged in the direction of the threads. If a space exists between the cap 16 and surface 26, the O-ring may be partially extruded therein and suffer damage. The present construction, which is similar in this respect to the closure disclosed in U.S. Pat. No. 4,288,001, avoids this problem.

A pair of shafts 36 are welded to the cap 16 at opposite sides thereof. These may be used for turning it with respect to the cylindrical member 12. A third shaft 38 is welded to the top of the cap and extends through a tee 40, washer 42, and hex nut 44. A shaft 46 is secured to the hex nut 44 for turning it to raise or lower the cap once it is disengaged from member 12.

The tee 40 is supported by a length of bent pipe 48, two sections of which are shown in FIG. 1. This arrangement is employed where the cylindrical member is mounted vertically to a pressure vehicle. The lower section of the pipe 48 extends through a clamp collar 50 and a second tee 52. A length of pipe 54 is used to secure the second tee 52 to the cylindrical member 12. Once the cap has been raised therefrom, it may be swung out of the way to allow access to the member 12 and pipeline.

A pressure relief assembly 56 is provided for slowly relieving the pressure prior to removing the cap. Similar assemblies are shown in U.S. Pat. Nos. 3,990,605 and 4,288,001. The present assembly includes a pressure indicator plug 58 mounted upon a shaft 60. A threaded opening 62 is provided within the member 12 for receiving a threaded shaft (not shown) within shaft 60. Gas may be vented through this opening.

An angle clip 64 having an aperture therein for receiving shaft 60 is welded to the cap 16. This insures that the threaded shaft has been removed from the opening 62 thereby venting the assembly prior to removing the cap.

A bracket 66 having an instruction plate 68 mounted thereto is welded to the angle clip 64 and the cap. This insures that the operator will correctly utilize the closure assembly 10.

FIG. 3 illustrates a slightly different embodiment of the invention. It has similar parts as the embodiment shown in FIGS. 1–2 and the same numerals are accordingly utilized to designate them. The pressure relief assembly 56' is slightly different in construction but performs basically the same function as that in the first embodiment. The opening 62' has a tapered portion which adjoins a much smaller passage 62" to restrict fluid flow.

In operation, the cap 16 is secured to the member 12 and the vent 62 or 62' closed. No preloading is required. The cap includes a flat interior side wall section 70 against which the external surface 26 of the projection 18 rests. Application of pressure causes dilation of the thin wall 22 closing any gap left for assembly between the projection 18 and the cap wall 70. Assembly is non-critical as to axial location. The parts may accordingly fit together loosely with no preload. The pressure relief assembly bleeds pressure before the cap can be rotated off the cylindrical member 12.

What is claimed is:

1. A closure assembly for high pressure applications comprising:
    a substantially cylindrical hollow member having a first open end adapted for attachment to a pressure vehicle and an opposing externally threaded open end and having an internal surface between the ends;
    an annular projection extending from said open end, said projection including a thin wall portion and a sealing portion mounted to a distal end of said thin wall portion, said thin wall portion being thinner than said hollow member;

said sealing portion including an annular internal surface and an external circumferential groove defined by a shoulder, an annular external surface, and a radially extending annular flange opposing said shoulder;

an O-ring positioned within said groove;

said thin wall portion including substantially flat, annular internal and external surfaces positioned a selected distance from the axis of said hollow member, the annular internal surface of said thin wall portion being spaced radially outwardly from the internal surface of said hollow member;

said radially extending annular flange having a radially outermost surface defined within the radius of said flat annular external surface;

said annular internal surface of said sealing portion being located radially inwardly with respect to said annular internal surface of said thin wall portion; and a cap having a closed end and an open internally threaded end for attachment to the threaded end of said hollow member, a substantially flat annular internal surface positioned within and adjacent to said threaded end, said substantially flat annular external surface of said thin wall portion being adjacent said substantially flat annular internal surface of said cap and said O-ring making sealing contact therewith when said threaded end of said cap is secured to said threaded end of said hollow member;

said thin wall portion capable of dilating under pressure into contact with said cap.

* * * * *